(12) United States Patent
Lin

(10) Patent No.: US 12,141,019 B2
(45) Date of Patent: Nov. 12, 2024

(54) EXPANSION APPARATUS WITH POWER MANAGEMENT FUNCTION

(71) Applicant: ATEMITECH CORPORATION, Taoyuan (TW)

(72) Inventor: Ying-Chao Lin, Taipei (TW)

(73) Assignee: ATEMITECH CORPORATION, Taoyuan (TW)

( * ) Notice: Subject to any disclaimer, the term of this patent is extended or adjusted under 35 U.S.C. 154(b) by 7 days.

(21) Appl. No.: 18/098,650

(22) Filed: Jan. 18, 2023

(65) Prior Publication Data

US 2023/0288981 A1 Sep. 14, 2023

Related U.S. Application Data

(60) Provisional application No. 63/317,881, filed on Mar. 8, 2022.

(51) Int. Cl.
*G06F 1/32* (2019.01)
*G06F 1/3296* (2019.01)

(52) U.S. Cl.
CPC .................. *G06F 1/3296* (2013.01)

(58) Field of Classification Search
CPC ..................................... G06F 1/3296
See application file for complete search history.

(56) References Cited

U.S. PATENT DOCUMENTS

| | | | |
|---|---|---|---|
| 6,070,215 A | 5/2000 | Deschepper et al. | |
| 6,145,029 A | 11/2000 | Deschepper et al. | |
| 10,345,880 B2* | 7/2019 | Shpiro | H02J 7/0042 |
| 2010/0058083 A1* | 3/2010 | Rangeley | G06F 1/26 |
| | | | 713/323 |
| 2019/0267817 A1* | 8/2019 | Weissinger | H02J 7/0013 |

FOREIGN PATENT DOCUMENTS

TW 202121109 A 6/2021
TW 202209041 A 3/2022

* cited by examiner

*Primary Examiner* — Zahid Choudhury
(74) *Attorney, Agent, or Firm* — Cooper Legal Group, LLC

(57) ABSTRACT

An expansion apparatus with a power management function includes a power supply device, an expansion module and a control module. The power supply device includes a controller and an output terminal, and provides a predetermined power through the output terminal. The expansion module includes an input port coupled to the output terminal, and multiple output ports operable to be coupled to multiple electronic apparatuses. The control module has a full-power output mode and a disabled mode, and receives a device identifier provided by the controller through the input port to learn the predetermined power, so as to selectively adjust the output ports to operate in the full-power output mode or the disabled mode based on the predetermined power, thereby limiting a total power consumed by the electronic apparatuses and the expansion module to be less than or equal to the predetermined power.

20 Claims, 5 Drawing Sheets

EXPANSION APPARATUS WITH POWER MANAGEMENT FUNCTION

The application claims priority to U.S. Provisional Application No. 63/317,881, filed on Mar. 8, 2022, the disclosure of which is hereby incorporated by reference herein in its entirety.

BACKGROUND OF THE INVENTION

Field of the Invention

The present invention relates to an expansion apparatus, and more particularly, to an expansion apparatus with a power management function.

Description of the Prior Art

With constant advancement of technologies, an increasing number of electronic apparatuses (for example but not limited to, smartphones, tablet computers and screens) play indispensable roles in people's everyday life. For an electronic apparatus, power supply convenience has long been an inevitable issue. In particular, as numbers of products becoming electronic continues to grow, there is a need for a more efficient means for powering electronic apparatuses. On the other hand, with a change in the usage habits, a user may concurrently own multiple electronic apparatuses. For numerous electronic apparatuses, power from a power supply may not be efficiently distributed, such that the user may need to expand the power supply to multiple power sources, resulting in complications for the user.

To solve the above issues, there is also an increasing number of expansion apparatuses that primarily distribute power to multiple electronic apparatuses through one single expansion apparatus, so as to achieve a function of supplying power to multiple electronic apparatuses by one single power source (usually referring to an adapter). However, if an amount of power needed by the multiple electronic apparatuses exceeds an allowable load of the adapter, an entire expansion apparatus may become overloaded and hence malfunctions. Especially for an adapter with a small specification that provides a lower power, too many electronic apparatuses may be connected thereto by mistake if not enough attention is paid.

Therefore, it is a vital task of the applicant of the present application as how to design an expansion apparatus with a power management function, so as to prevent issues of malfunction of an entire expansion apparatus in case that power required by electronic apparatuses is higher than an allowable load of a power source.

SUMMARY OF THE INVENTION

To solve the above issues, the present invention provides an expansion apparatus with a power management function so as to overcome drawbacks of the prior art. Accordingly, an expansion apparatus with a power management function of the present invention includes a power supply device, an expansion module, and a control module. The power supply device includes a controller and an output terminal, and provides a predetermined power through the output terminal. The expansion module includes an input port and a plurality of output ports, wherein the input port is coupled to the output terminal, and the output ports are operable be coupled to a plurality of electronic apparatuses. The control module has a full-power output mode and a disabled mode, and receives a device identifier provided by the controller through the input port to learn the predetermined power, so as to selectively adjust the output ports to operate in the full-power output mode or the disabled mode based on the predetermined power, thereby limiting a total power consumed by the electronic apparatuses and the expansion module to be less than or equal to the predetermined power.

To solve the above issues, the present invention provides a power management method for an expansion apparatus so as to overcome drawbacks of the prior art. Accordingly, an expansion apparatus with a power management function of the present invention includes a power supply device and an expansion module, wherein the expansion module includes a plurality of output ports operable to be coupled to a plurality of output ports. The power management method includes following steps: (a) receiving a predetermined power provided from a power supply device, and receiving a device identifier provided by the power supply device to learn the predetermined power; (b) controlling, based on a total power consumed by the electronic apparatus and the expansion module that is less than or equal to the predetermined power, the output ports to operate in a full power mode; and (c) setting a weighting ratio of the output ports, and preferentially adjusting, based on a condition that the total power is greater than or equal to the predetermined power, the output port with a lower weighting ratio to a disabled mode or a reduced power output mode, so as to limit the total power to be less than or equal to the predetermined power.

The main objects and effects of the present invention are that, the expansion apparatus receives the device identifier provided by the controller of the power supply device through the input port to learn an upper limit of the predetermined power of the power supply device, and selectively adjusts, based on the predetermined power, the output ports to operate in the full power output mode or the disabled mode, so as to limit the total power consumed by the electronic apparatus and the expansion module to be less than or equal to the predetermined power, thereby preventing the total power demand from getting higher than the predetermined power and hence from causing malfunction of an entire expansion apparatus.

To further understand the techniques, means and functions expected to be achieved by the present invention, the present invention is described in detail with the accompanying drawings below so that the specific objects, features and characteristics can be accordingly better understood. It should be noted that the drawings provided are for reference and illustration purposes, and are not to be construed as limitations to the present invention.

DETAILED DESCRIPTION OF THE EMBODIMENTS

The technical contents and details of the present invention are described with the accompanying drawings below.

Figure 1:
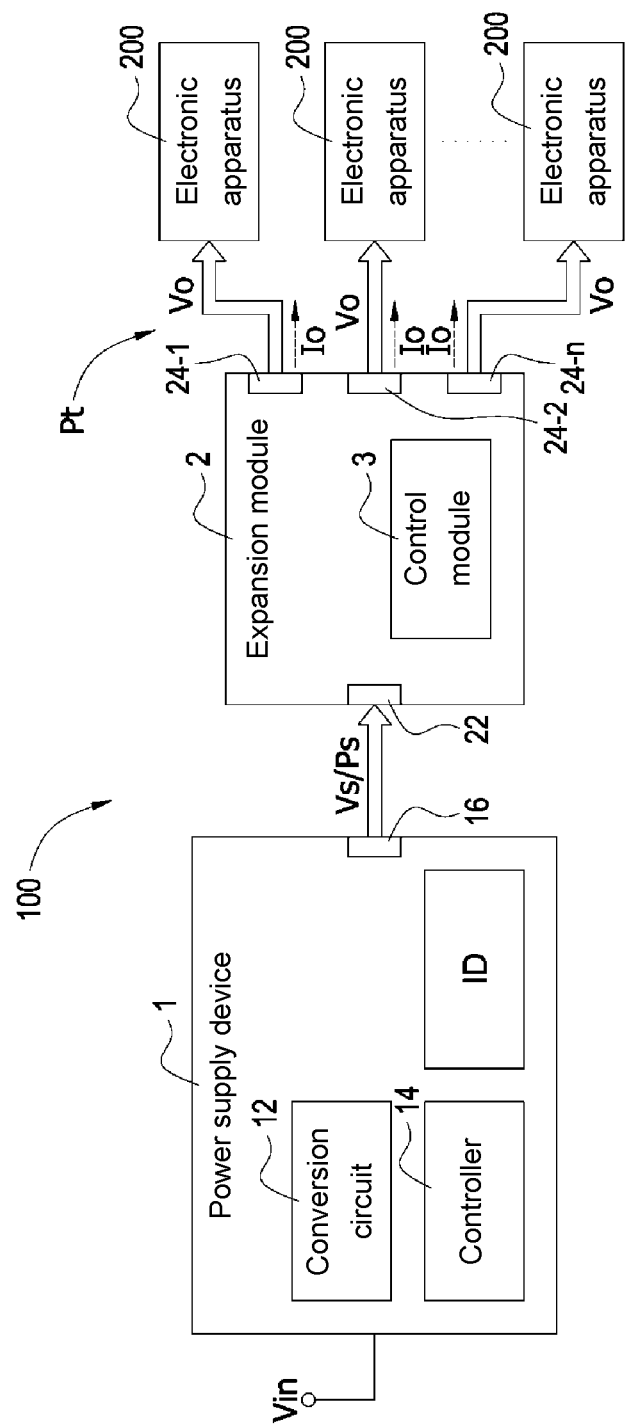
FIG. 1 is a circuit block diagram of an expansion apparatus with a power management function according to a first embodiment of the present invention.

FIG. 1 shows a circuit block diagram of an expansion apparatus with a power management function according to a first embodiment of the present invention. Referring to FIG. 1, the expansion apparatus 100 includes a power supply device 1, an expansion module 2, and a control module 3, wherein the expansion module 2 is coupled to the power supply device 1 and the control module 3. The power supply device 1 includes a conversion circuit 12, a controller 14, and an output terminal 16, wherein the controller 14 is coupled to the conversion circuit 12 and the output terminal 16. The conversion circuit 12 receives an input voltage Vin. The controller 14 is configured to control the conversion circuit 12 to convert the input voltage Vin to a predetermined voltage Vs, so as to provide the predetermined voltage Vs to the expansion module 2 through the output terminal 16. The power supply device 1 is, for example but not limited to, a general power supply device such as an adapter, and is capable of providing a predetermined power Ps (that is, a predetermined wattage) to the expansion module 2 through the output terminal 16, for the use of back-end devices. A value of the predetermined power Ps is primarily limited by circuit parameters of the conversion circuit 12 or operation parameters of the controller 14, and a total power Pt (that is, an upper limit) that can be supplied/consumed by an entire expansion apparatus 100 is limited by the value of the predetermined power Ps.

The expansion module 2 includes an input port 22 and a plurality of output ports 24-1 to 24-n, wherein the input port 22 is coupled to the output terminal 16 so as to receive the predetermined voltage Vs through the input port 22. Based on the predetermined voltage Vs, the expansion module 2 provides an output voltage Vo to the output ports 24-1 to 24-n, so as to provide the output voltage Vo to power the electronic apparatus 200 through the output ports 24-1 to 24-n. The output ports 24-1 to 24-n may be a plurality of different predetermined ports, and may be in types including, for example but not limited to, ports such as USB Type-A, USB Type-B, USB Type-C, HDMI, and network ports, which are operable to be coupled to an electronic apparatus 200 (for example but not limited to, a laptop computer, a cellphone, or a screen) having a same type of port. The control module 3 may be configured in the expansion module 2, and is capable of setting operation modes of the output ports 24-1 to 24-n, so as to prevent the total power Pt consumed by the electronic apparatus 200 from exceeding the upper limit that can be supplied by the power supply device 1.

More specifically, the control module 3 primarily adjusts the operation mode of each of the output ports 24-1 to 24-n based on the predetermined power Ps and the total power Pt, wherein the operation mode at least includes a full power output mode and a disabled mode. The control module 3 receives a device identifier ID provided from the controller 14 of the power supply device 1 through the input port 22 and learns an upper limit of the predetermined power Ps of the power supply device 1, and selectively adjusts, based on the predetermined power Ps, the output ports 24-1 to 24-n to operate in the full power output mode or the disabled mode, so as to limit the total power Pt consumed by the electronic apparatus 200 and the expansion module 2 to be less than or equal to the predetermined power Ps. The device identifier ID may notify the control module 3 of the type/specification of the power supply device 1 by means of coupling an ID pin or an ADC pin of the controller 14 to the control module 3. Alternatively, the control module 3 may be notified of the type/specification of the power supply device 1 by means of coupling a Dallas 1-wire pin to the control module 3.

Further, the control module 3 may set weighting ratios of the output ports 24-1 to 24-n by means of, for example but not limited to, according to the types of the output ports 24-1 to 24-n or designating priorities of the output ports 24-1 to 24-n, or the weighting ratios of the output ports 24-1 to 24-n may be set by a self-defined priority order through an operation interface (not shown) of the expansion module 2. When the control module 3 detects that the total power Pt is greater than or equal to the predetermined power Ps, the control module 3 may preferentially adjust the output ports 24-1 to 24-n having lower weightings to the disabled mode based on settings of the weighting ratios. In addition, the control module 3 may further determine the weighting ratios according to the priority of the electronic apparatus 200 with respect to the output ports 24-1 to 24-n, in a way that the electronic apparatus 200 connected first is prioritized to be powered first. The weighting ratios may be weighed based on one single condition or multiple consolidated conditions, and are not specifically defined herein. It should be noted that, in one embodiment of the present invention, the control module 3 may be a controller having a data processing/determination function, such as a programmable controller or a microcontroller.

For example, assume that the upper limit of the predetermined power Ps that can be supplied by the power supply device 1 is 65 W, and the power consumption of the expansion module 2 is 30 W (with the consumption of the output ports 24-1 to 24-n added). In this case, assume that there are three electronic apparatuses 200 coupled to three output ports 24-1 to 24-n, and the power consumed by the three electronic apparatuses 200 are respectively 10 W, 20 W and 30 W, totaling up to a total power Pt of 90 W. In a conventional power expansion apparatus 100, when all of the three electronic apparatuses 200 are in operation, the predetermined power Ps that can be supplied by the power supply device 1 is inevitably insufficient for powering the three electronic apparatuses 200 (that is, 30 W+10 W+20 W+30 W=90 W, which exceeds 65 W of the predetermined power Ps), leading to malfunction of the entire expansion apparatus 100.

Since the present invention sets the operation modes of the output ports 24-1 to 24-n based on the predetermined power Ps and the total power Pt by the control module 3, the control module 3 may set, for example but not limited to, the output ports 24-1 to 24-n connected to the electronic apparatus 200 in 10 W and 20 W to the full power output mode, so as to provide a full power for powering the two for normal operations. Remaining output ports 24-1 to 24-n with 30 W are set to the disabled mode, and this electronic apparatus 200 is temporarily not supplied with power. Thus, the power consumption of the expansion module 2 added with the consumption of the two electronic apparatuses 200 are, for example but not limited to, 10 W+20 W, which is less than 65 W and does not exceed the upper limit of the predetermined power Ps (65 W). Therefore, the expansion apparatus 100 remains functional, and malfunction of the entire expansion apparatus 100 is not caused as a result of the required total power Pt being higher than the predetermined power Ps.

Figure 2:
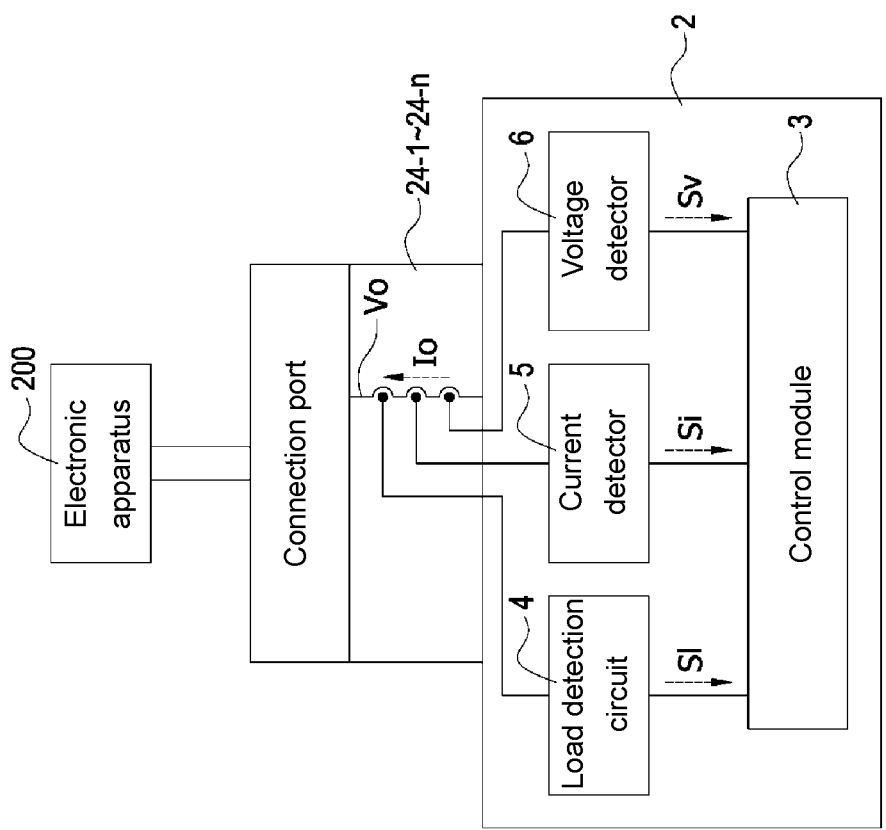
FIG. 2 is a circuit block diagram of output ports of an expansion apparatus according to the first embodiment of the present application.

FIG. 2 shows a circuit block diagram of the output ports of the expansion apparatus according to the first embodiment of the present application. Refer to FIG. 1 in combination. The expansion apparatus 100 further includes a plurality of load detection circuits 4, a plurality of current detectors 5, and a plurality of voltage detectors 6. The load detection circuits 4 are correspondingly coupled to the output ports 24-1 to 24-$n$, and respectively detect load types of the electronic apparatuses 200 coupled to the output ports 24-1 to 24-$n$ so as to provide a load detection signal SI to the control module 3. The control module 3 learns the load types through the load detection signal SI, and determines, according to the load types, to which operation modes the output ports 24-1 to 24-$n$ are to be adjusted. The load types are, for example but not limited to, a type as an energy storage battery that needs to be charged, a type as a conversion circuit that needs to be continuously powered, or even a type as a power source that can provide power back to the expansion module 2.

More specifically, the control module 3 is predetermined with load information, and receives the load detection signal SI to compare whether information corresponding to the load detection signal SI matches the load information. When the information corresponding to the load detection signal SI matches the load information, the control module 3 then learns the load types of the connected electronic apparatuses 200. The load information and the type of the load detection signal SI may be types such as a data format (for example but not limited to, an identifier) or a waveform signal, and is not specifically defined herein.

When the control module 3 learns the load type of each connected electronic apparatus 200, the control module 3 sets the weighting ratio based on the load types. For example, but not limited to, the type as an energy storage battery may be set with a lower weighting ratio since the energy storage battery does not need to operate continuously. In contrast, the type as a conversion circuit that needs to be powered continuously is set with a higher weighting ratio. When the information corresponding to certain electronic apparatuses 200 does not match the load information in a way that the control module 3 cannot determine the load type of the electronic apparatus 200, the control module 3 may adjust the operation modes of the output ports 24-1 to 24-$n$ connected to the electronic apparatus 200. For example, but not limited to, for safety reasons, the operation mode is set to the disabled mode, or a current limiting mode that limits a current, so that the current supplied to the electronic apparatus 200 is limited to a predetermined current.

The current detectors 5 are correspondingly coupled to the output ports 24-1 to 24-$n$, and respectively detect an output current Io flowing through the output ports 24-1 to 24-$n$, so as to provide a current detection signal Si corresponding to the output current Io to the control module 3. The control module 3 learns a value of the output current Io provided to the electronic apparatus 200 through the current detection signal Si, and calculates the power usage of each electronic apparatus 200. Similar to electricity calculation of an electric meter, the power consumed by the electronic apparatus 200 during a period in which the electronic apparatus 200 is connected to the output ports 24-1 to 24-$n$ is calculated. The control module 3 may be predetermined with an upper usage limit for one or multiple of the output ports 24-1 to 24-$n$, and adjusts the output ports 24-1 to 24-$n$ to the disabled mode based on the moment the output current Io flowing through the set output ports 24-1 to 24-$n$ correspondingly exceeds the upper usage limit, so as to prevent the power consumption of certain electronic apparatuses 200 from getting overly large and from occupying most of the power usage of the expansion apparatus 100.

The voltages detectors 6 are correspondingly coupled to the output ports 24-1 to 24-$n$, and respectively detect an output voltage Vo of the output ports 24-1 to 24-$n$, so as to provide a voltage detection signal Sv corresponding to the output voltage Vo to the control module 3. The control module 3 learns a value of the output voltage Vo provided to the output ports 24-1 to 24-$n$ through the voltage detection signal Sv, so as to determine whether the output voltage Vo is normal. The control module 3 is predetermined with a plurality of voltage ranges (for example but not limited to, 5V, 9V and 12V) for each output port, and adjusts the corresponding output ports 24-1 to 24-$n$ to the disabled mode based on the moment the output voltage Vo of the output ports 24-1 to 24-$n$ correspondingly exceeds the voltage range, so as to prevent the output voltage Vo from getting too high or too low and hence from causing damage to the expansion apparatus 100 or the electronic apparatus 200. The upper and lower limits of the voltage range may be set based on over-voltage protection (OVP) or under-voltage protection (UVP). Regarding the calculation for the power consumption of the electronic apparatus 200, the calculation may be performed in combination with the current detection signal Si and the voltage detection signal Sv.

Again referring to FIG. 2, to prevent a sudden change in the output current Io from affecting and causing malfunction of the electronic apparatus 200, when the control module 3 is to adjust one of the output ports 24-1 to 24-$n$ from a non-disabled mode to the disabled mode, the control module 3 first adjusts the load of the one of the output ports 24-1 to 24-$n$ to a load-free state, and then adjusts the one of the output ports 24-1 to 24-$n$ to the disabled mode. That is to say, the control module 3 first reduces the output current Io flowing through the one of the output ports 24-1 to 24-$n$ to low output current and even reduces the low output current Io to zero, and then adjusts the one of the output ports 24-1 to 24-$n$ to the disabled mode, so as to prevent the electronic apparatus 200 from being affected by a sudden change in the output current Io and hence from malfunctioning.

It should be noted that, in one embodiment of the present invention, the predetermined power Ps of the expansion apparatus 100 that is less than the total power Pt consumed by the electronic apparatus 200 is merely illustrative, and a situation where the predetermined power Ps is greater than the total power Pt is not further discussed in the present invention. Moreover, the total power Pt of the embodiment may also refer to a maximum output power (that is, a rated power) specified by the electronic apparatus 200, or may refer to a power actually consumed by the electronic apparatus 200 currently. For example but not limited to, one electronic apparatus 200 may be marked with a rated power of 50 W, but may merely consume only a power of 10 W as having a low load currently. Thus, the control module 3 may perform control based on the rated power of the electronic apparatus 200, or may perform control based on the power actually consumed by the electronic apparatus 200. However, a preferred embodiment in which the control module 3 performs control based on the power actually consumed by the electronic apparatus 200 achieves an effect of significantly enhancing a power utilization rate.

For example, assume the power supply device 1 having the predetermined power Ps of 95 W is used, and the expansion module 2 has one USB Type-C port (15 W output), four USB Type-A ports (7.5 W output) and one electronic apparatus 200 (65 W). In the above example, the power supply device 1 having the predetermined power Ps of 95 W is insufficient for supplying the total power Pt consumed by the expansion module 2 and all of the ports (assuming the electronic apparatus 200 is fully turned on at a full load (calculated by an equation as 5 W+65 W+15 W*1+7.5 W*4=155 W>95 W). Thus, the control module 3 may set some of the output ports 24-1 to 24-n with restrictions to the disabled mode by setting the weighting ratios. For example, but not limited to, the control module 3 sets one USB Type-C port and three USB Type-A ports to the full power output mode, and sets one USB Type-A port to the disabled mode (calculated by an equation as 5 W+65 W+15 W+7.5 W=92.5 W<95 W). Alternatively, the control module 3 sets four USB Type-A ports to the full power output mode, and sets one USB Type-C port to the disabled mode (calculated by an equation as 5 W+65 W+7.5 W*3=92.5 W<95 W).

Figure 3:
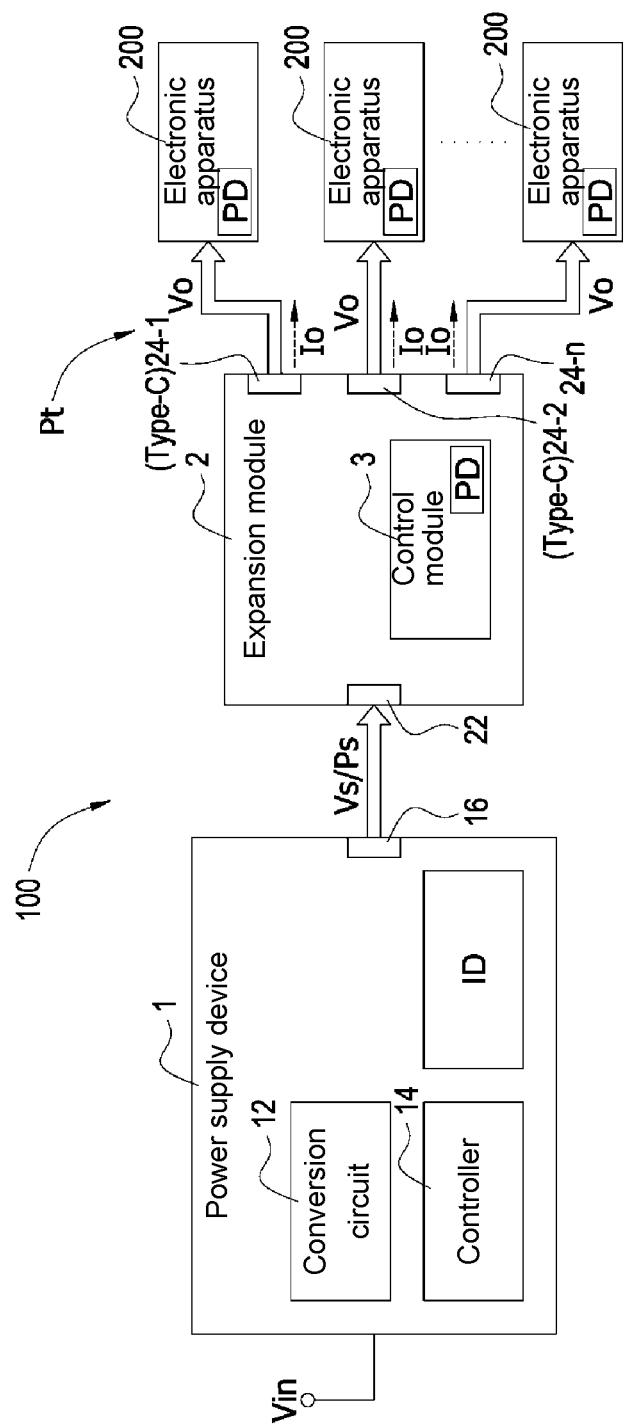
FIG. 3 is a circuit block diagram of an expansion apparatus with a power management function according to a second embodiment of the present invention.
Figure 4:
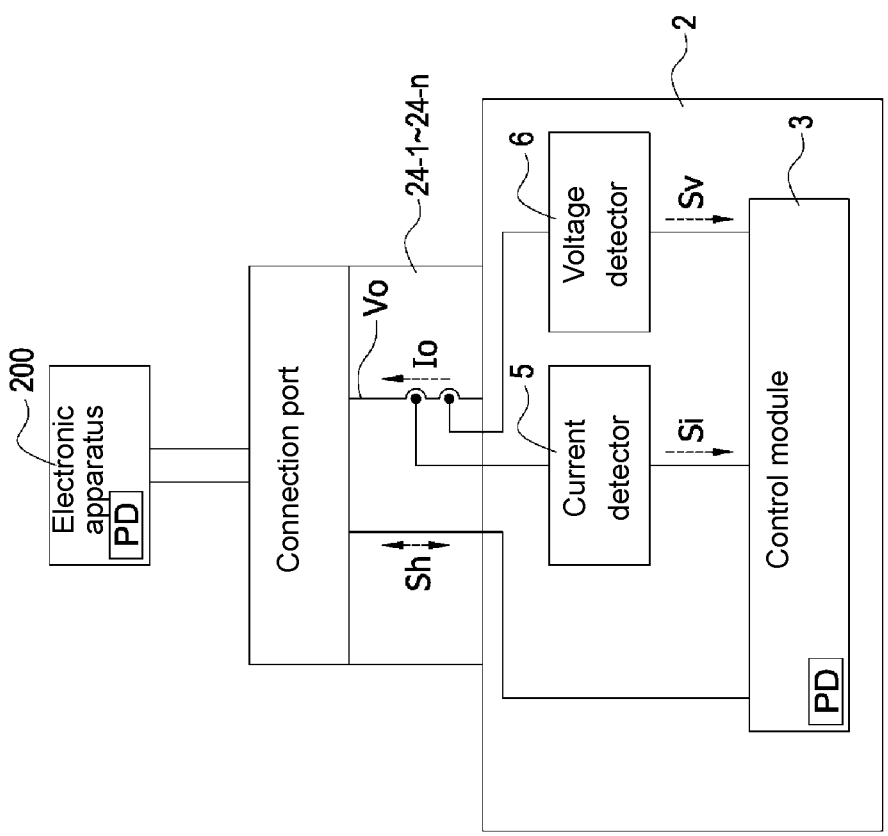
FIG. 4 is a block diagram of output ports of an expansion apparatus according to the second embodiment of the present application.

Refer to FIG. 3 showing a circuit block diagram of an expansion apparatus with a power management function according to a second embodiment of the present invention, and FIG. 4 shows a circuit block diagram of output ports of the expansion apparatus according to the second embodiment of the present invention. Also refer to FIG. 1 and FIG. 2. The embodiment in FIG. 3 differs from that in FIG. 1 in that, the control module 3 is defined with a Power Delivery (PD) protocol, and further has a reduced power output mode. Because the control module 3 is defined with the PD protocol, the expansion module 2 at least includes a USB Type-C port and is similarly operable to be connected to the electronic apparatus 20 similarly defined with the PD protocol, so as to provide more flexible transmission performance to satisfy power requirements of various apparatuses. More specifically, the control module 3 receives a handshake signal Sh provided by the electronic apparatus 200 defined with the PD protocol through the output ports 24-1 to 24-n, and adjusts, based on the handshake signal Sh, the output ports 24-1 to 24-n to operate in the reduced power output mode, hence similarly limiting the total power Pt to be less than equal to the predetermined power Ps.

The reduced power output mode refers to a mode in which the control module 3 dynamically adjusts a power data object (PDO), and reduces the PDO to a voltage/current specification acceptable to the electronic apparatus 200 (for example, from the full power output mode of 20V/5 A to 20V/3.75 A, 20V/3 A, 15V/3 A, 9V/3 A, or 5V/3 A). Moreover, the control module 3 may dynamically adjust a control mode for the PDO into two modes including a manual control mode and an automatic control mode. In the manual control mode, a user may switch the PDO as desired; in the automatic control mode, the output current Io and/or the output voltage Vo can be adjusted. Except for the USB Type-C port that can include the reduced power output mode, this rule cannot be used by the output ports 24-1 to 24-n not defined with the PD protocol, and the control module 3 similarly operates these output ports 24-1 to 24-n in the full power output mode or the disabled output mode according to the logic of FIG. 1.

Due to the presence of the reduced power output mode in FIG. 3, the control module 3 is slightly modified in terms of signal detection and control compared to FIG. 1. More specifically, in terms of load detection, the control module 3 is capable of handshaking and communicating with the electronic apparatus 200 through the handshake signal Sh. Thus, the control module 3 can learn the load type of the electronic apparatus 200 without involving detection of the load detection circuit 4, and set the weighting ratio based on the load type. Then, based on a condition when the total power Pt is greater than or equal to the predetermined power Ps, the control module 3 preferentially adjusts the output ports 24-1 to 24-n having lower weighting ratios and defined with the PD protocol to the reduced power output mode, so as to prevent the total power Pt consumed by the electronic apparatus 200 from exceeding the upper limit that can be supplied by the power supply device 1.

In terms of current detection, the control module 3 can similarly learn the value of the output current Io of the electronic apparatus 200 through the current detection signal Si, and calculate the power usage of the electronic apparatus 200. The control module 3 may be predetermined with an upper usage limit for one or multiple of the output ports 24-1 to 24-n defined with the PD protocol, and adjusts the output ports 24-1 to 24-n to the reduced power mode based on a moment when the output current Io flowing through the set output ports 24-1 to 24-n correspondingly exceeds the upper usage limit, so as to prevent the power consumption of certain electronic apparatuses 200 from getting overly large and from occupying most of the power usage of the expansion apparatus 100.

For example, assume the power supply device 1 having the predetermined power Ps of 95 W is used, and the expansion module 2 has two USB Type-C port (15 W output), one USB Type-A port (7.5 W output) and one electronic apparatus 200 (65 W) defined with the PD protocol. In the above example, the power supply device 1 having the predetermined power Ps of 95 W is insufficient for supplying the total power Pt consumed by the expansion module 2 and all of the ports (assuming the electronic apparatus 200 is fully turned on at a full load (calculated by an equation as 5 W+65 W+15 W*2+7.5 W=107.5 W>95 W)). Thus, the control module 3 may set some of the output ports 24-1 to 24-n with restrictions to the reduced power output mode by setting the weighting ratios. For example, but not limited to, after deducting 5 W, the control module 3 provides a power of 90 W. Further with adaptation of the control module 3, the operation mode of the USB Type-A port is selectively adjusted to the disabled mode, or the USB Type-C ports are adjusted to the reduced power output mode, or the voltage/current provided by the output ports 24-1 to 24-n is reduced after communicating with the electronic apparatus 200 through the handshake signal Sh, so that the consumption of these apparatuses does not exceed 90 W.

Figure 5:
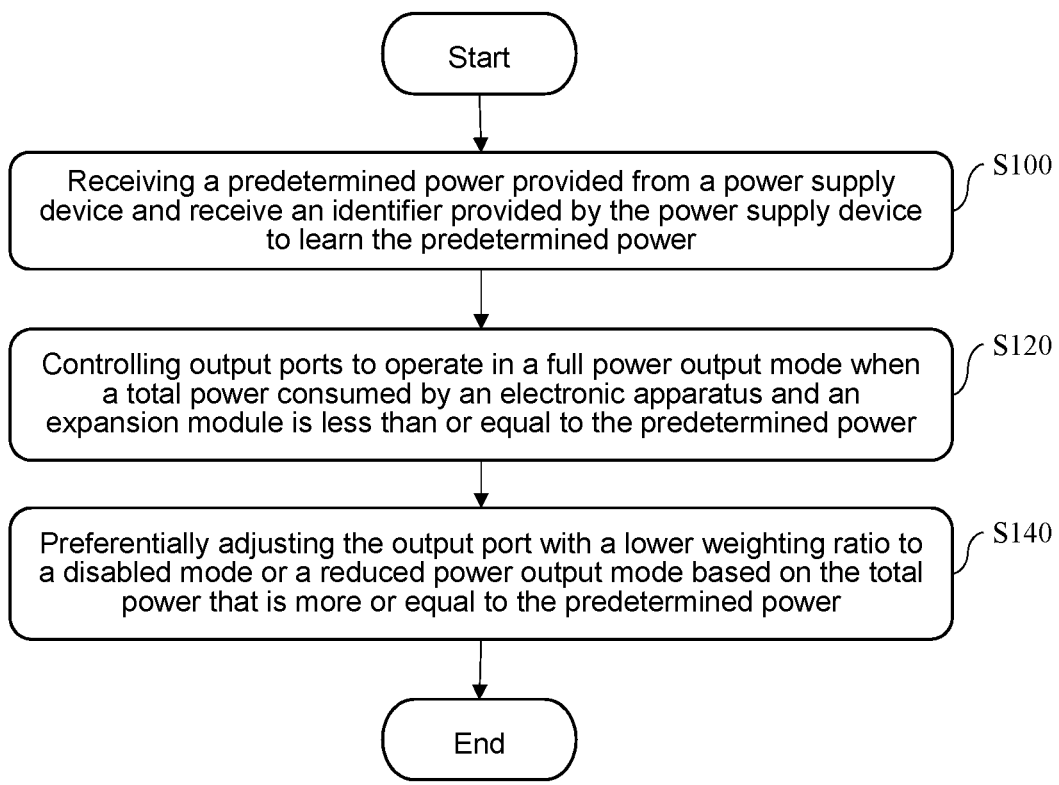
FIG. 5 is a flowchart of a power management method for an expansion apparatus of the present invention.

Refer to FIG. 5 showing a flowchart of a power management method for an expansion apparatus of the present invention, and also refer to FIG. 1 to FIG. 4 in combination. The power management method of the present invention is primarily used for the expansion apparatus 100, and is primarily for preventing the total power Pt consumed by the expansion module 2 and the coupled electronic apparatus 200 from exceeding the predetermined power Ps that can be supplied by the power supply device 1 and hence from causing malfunction of the entire expansion apparatus 100. Thus, the power management method of the present invention includes receiving a predetermined power provided from a power supply device, and receiving a device identifier provided by the power supply device to learn the predetermined power (S100). The present invention primarily uses the control module 3 to control the power supply device 1 and the expansion module 2, and the expansion module 2 can receive the predetermined power Ps provided by the power supply device 1 and the device identifier ID through the input port 22. The device identifier ID may notify the control module 3 of the type/specification of the power supply device 1 by means of coupling an ID pin or an ADC pin of the controller 14 to the control module 3. Alternatively, the control module 3 may be notified of the type/specification of the power supply device 1 by means of coupling a Dallas 1-wire pin to the control module 3.

Then, based on a condition that a total power consumed by the electronic apparatus and the expansion module is less than or equal to the predetermined power, the output ports are controlled to operate in a full power output mode (S200). When the control module 3 determines that the total power Pt consumed by the electronic apparatus 200 and the expansion module 2 is less than or equal to the predetermined power Ps, it means that the predetermined power Ps provided by the power supply device 1 is capable of fully meeting the power consumed by back-end devices, so the control module 3 controls the output ports 24-1 to 24-n to operate in the full power output mode. Conversely, based on a condition that the total power is greater than or equal to the predetermined power, the output port with a lower weighting ratio is adjusted to a disabled mode or a reduced power output mode (S300). When the control module 3 determines that the total power Pt consumed by the electronic apparatus 200 and the expansion module 2 is greater than or equal to the predetermined power Ps, it means that the predetermined power Ps provided by the power supply device 1 is incapable of meeting the power consumed by the back-end devices. Thus, based on predetermined weighting ratios, the control module 3 preferentially adjusts the output ports with lower weighting ratios to the disabled mode or the reduced power output mode, so as to prevent the total power Pt consumed by the electronic apparatus 200 and the expansion module 2 from exceeding the predetermined power Ps and hence from causing malfunction of the entire expansion apparatus 100.

The above description are merely details and drawings of preferred specific embodiments of the present invention, and it should be noted that the features of the present invention are not limited to the above examples and are not to be construed as limitations to the present invention. Therefore, the scope of the present invention is to be accorded with the appended claims. All embodiments within the spirit and embodiments similar to the claims of the present invention are to be covered within the scope of the present invention. Moreover, all equivalent changes and modifications conceivable to a person skill in the art are also to be encompassed within the scope of the claims of the present invention.

What is claimed is:

1. An expansion apparatus, comprising:
   a power supply device comprising a controller and an output terminal and providing a predetermined power through the output terminal;
   an expansion module comprising an input port and a plurality of output ports, the input port coupled to the output terminal, and the output ports operable to be coupled to a plurality of electronic apparatuses; and
   a control module having a full-power output mode and a disabled mode and receiving a device identifier provided by the controller through the input port to learn the predetermined power, so as to selectively adjust the output ports to operate in the full-power output mode or the disabled mode based on the predetermined power, thereby limiting a total power consumed by the electronic apparatuses and the expansion module to be less than or equal to the predetermined power.

2. The expansion apparatus according to claim 1, wherein the control module sets a weighting ratio of the output ports, and adjusts the output port with a lower weighting ratio to the disabled mode based on a condition when the total power is greater than or equal to the predetermined power.

3. The expansion apparatus according to claim 2, further comprising:
   a plurality of load detection circuits correspondingly coupled to the output ports and respectively detecting a plurality of load types of the electronic apparatuses coupled to the output ports;
   wherein, the control module sets the weighting ratio based on the load types.

4. The expansion apparatus according to claim 3, wherein the control module is predetermined with load information, and adjusts the corresponding output port to the disabled mode based on a condition when at least one of the load types does not match the load information.

5. The expansion apparatus according to claim 1, further comprising:
   a plurality of current detection circuits correspondingly coupled to the output ports and respectively detecting a plurality of output currents flowing through the output ports;
   wherein the control module predetermines a plurality of upper usage limits for the output ports, and adjusts the corresponding output port to the disabled mode based on a condition when the output current of at least one of the output ports correspondingly exceeds the upper usage limit.

6. The expansion apparatus according to claim 1, wherein the control module is defined with a Power Delivery (PD) protocol and has a reduced power output mode; the control module receives a plurality of handshake signals provided by the electronic apparatuses through the output ports, and adjusts at least one of the output ports to operate in the reduced power output mode based on the handshake signals so as to limit the total power to be less than or equal to the predetermined power.

7. The expansion apparatus according to claim 6, wherein the control module learns a plurality of load types of the electronic apparatuses based on the handshake signals, and sets a weighting ratio of the output ports based on the load types.

8. The expansion apparatus according to claim 7, wherein the control module is predetermined with load information, and adjusts the corresponding output port to the disabled mode based on a condition when at least one of the load types does not match the load information.

9. The expansion apparatus according to claim 6, wherein the control module sets a weighting ratio of the output ports, and adjusts the output port with a lower weighting ratio to the reduced power output mode based on a condition when the total power is greater than or equal to the predetermined power.

10. The expansion apparatus according to claim 6, further comprising:
    a plurality of current detection circuits correspondingly coupled to the output ports and respectively detecting a plurality of output currents flowing through the output ports;
    wherein the control module predetermines a plurality of upper usage limits for the output ports, and adjusts the corresponding output port to the reduced power output mode based on a condition when the output current of at least one of the output ports correspondingly exceeds the upper usage limit.

11. The expansion apparatus according to claim 1, further comprising:

a plurality of voltage detection circuits correspondingly coupled to the output ports and respectively detecting a plurality of output voltages provided to the output ports;

wherein the control module predetermines a plurality of voltage ranges for the output ports, and adjusts the corresponding output port to the disabled mode based on a condition when the output voltage of at least one of the output ports correspondingly exceeds the voltage ranges.

12. The expansion apparatus according to claim 1, wherein types of the output ports comprise at least one of universal serial bus (USB) Type-A, USB Type-B, USB Type-C, HDMI and network ports.

13. The expansion apparatus according to claim 1, wherein when the control module is to adjust at least one of the output ports from a non-disabled mode to the disabled mode, the control module adjusts a load of the at least one of the output ports to a load-free state, and then adjusts the at least one of the output ports to the disabled mode.

14. A power management method for an expansion apparatus, the expansion apparatus comprising a power supply device and an expansion module, the expansion module comprising a plurality of output ports operable to be coupled to a plurality of electronic apparatuses; the power management method comprising steps of:

receiving a predetermined power provided from a power supply device, and receiving a device identifier provided by the power supply device to learn the predetermined power;

controlling, based on a total power consumed by the electronic apparatuses and the expansion module being less than or equal to the predetermined power, the output ports to operate in a full power output mode; and setting a weighting ratio of the output ports, and preferentially adjusting, based on the total power being greater than or equal to the predetermined power, the output port with a lower weighting ratio to a disabled mode or a reduced power output mode, so as to limit the total power to be less than or equal to the predetermined power.

15. The method of claim 14, further comprising steps of:
detecting a plurality of load types of the electronic apparatuses coupled to the output ports; and
setting the weighting ratio based on the load types.

16. The method of claim 15, further comprising a step of:
adjusting the corresponding output port to the disabled mode based on a condition when at least one of the load types does not match load information.

17. The method of claim 14, further comprising steps of:
detecting a plurality of output currents flowing through the output ports; and
adjusting the corresponding output port to the disabled mode based on a condition when the output current of at least one of the output ports correspondingly exceeds a predetermined upper usage limit.

18. The method of claim 14, further comprising steps of:
receiving a plurality of handshake signals provided by the electronic apparatuses through the output ports; and
adjusting at least one of the output ports to operate in the reduced power output mode based on the handshake signals so as to limit the total power to be less than or equal to the predetermined power.

19. The method of claim 18, further comprising a step of:
learning a plurality of load types of the electronic apparatuses based on the handshake signals;
wherein setting the weighting ratio comprises setting the weighting ratio based on the load types.

20. The method of claim 19, further comprising a step of:
adjusting the corresponding output port to the disabled mode based on a condition when at least one of the load types does not match load information.

* * * * *